United States Patent [19]

Bryan

[11] Patent Number: 5,299,246
[45] Date of Patent: Mar. 29, 1994

[54] SHAPE-MEMORY ALLOYS IN THE CONSTRUCTION OF NUCLEAR FUEL SPACER GRIDS

[75] Inventor: William J. Bryan, Granby, Conn.

[73] Assignee: Combustion Engineering, Inc., Windsor, Conn.

[21] Appl. No.: 950,593

[22] Filed: Sep. 25, 1992

[51] Int. Cl.$^5$ .............................................. G21C 3/34
[52] U.S. Cl. .................................... 376/462; 376/313; 376/440; 376/442; 376/352
[58] Field of Search ............... 376/352, 313, 440, 442, 376/462

[56] References Cited

U.S. PATENT DOCUMENTS

| | | | |
|---|---|---|---|
| 4,077,843 | 3/1978 | Patterson et al. | 376/442 |
| 4,198,081 | 4/1980 | Harrison et al. | 285/381 |
| 4,389,369 | 6/1983 | Bryan | 376/442 |
| 4,699,757 | 10/1987 | Cloue | 376/412 |
| 5,024,807 | 6/1991 | Hatfield et al. | 376/352 |

OTHER PUBLICATIONS

C. M. Wayman, "Some Applications of Shape-Memory Alloys", Journal of Metals, pp. 129-137, Jun. 1980.
Encyclopedia of Materials Science and Engineering, MIT Press, Cambridge, Mass., vol. 6, pp. 4635-4674 (1986).
Kirk-Othmer Encyclopedia of Chemical Technology, John Wiley & Sons, New York, vol. 20, pp. 726-736 (1982).
Raychem Corporation, Menlo Park, Calif., various documentation and illustrations of Raychem products "Tinel" and CryoFit.

Primary Examiner—Donald P. Walsh
Assistant Examiner—Frederick H. Voss
Attorney, Agent, or Firm—Ronald P. Kananen; John H. Mulholland

[57] ABSTRACT

A fuel assembly supporting structure for a nuclear reactor fuel assembly which comprises a two-way shape-memory alloy. A shape-memory alloy is selected which has an overall transition temperature range substantially above atmospheric temperature and substantially below a temperature experienced by the shape-memory alloy under reactor operating conditions. By using a shape-memory alloy in the design, the support structure assumes a first configuration for securely supporting one or a plurality of nuclear reactor components at a temperature above the overall transition temperature range and assumes a second configuration for loosely engaging the reactor components below the transition temperature range.

8 Claims, 7 Drawing Sheets

SHAPE-MEMORY ALLOYS IN THE CONSTRUCTION OF NUCLEAR FUEL SPACER GRIDS

FIELD OF THE INVENTION

The invention described herein relates to nuclear reactor fuel assemblies and more particularly to fuel assembly supporting structures comprising shape-memory alloys.

BACKGROUND OF THE INVENTION

Commercial nuclear reactors used for generating electric power include a core composed of a plurality of fuel assemblies which generate heat for electric power generation purposes. Each fuel assembly includes an array of fuel rods which are held in a spaced relationship with each other by means of spacer grids of egg-crate configuration spaced along the fuel assembly length. The fuel rods may be approximately 0.5 inch in diameter and about 12 feet long, thus requiring a number of supporting grids along their length.

As discussed in U.S. Pat. No. 5,024,807 to Hatfield et al., the disclosure of which is herein incorporated by reference, metallic debris in the coolant which collects or is trapped in fuel rod spacer grids adjacent to the fuel rod cladding is believed to be responsible for a significant percentage of known fuel rod failures. Traditional fuel assembly designs were known to sustain a distribution of debris-induced failures that clearly showed the lowest spacer grid to be a very effective filter for debris. Unfortunately, the short, lower end caps on the fuel rods of such fuel assemblies ensured that the hollow cladding tubes would be adjacent to the trapped debris, and that any flow-induced motion of the debris could wear through the thin wall of the tubes and cause rod failure. In traditional fuel assemblies, the lowest spacer grid was some distance up from the bottom of the fuel rod, since, in the absence of a positive axial capture device for the rod, the grid needed to be located at an elevation where it always laterally captured a "lifted" rod. Rods could potentially lift in response to coolant flow during abnormal conditions. One choice for a debris-resistant fuel assembly design is to merely lengthen the solid end cap such that it is extends up through the bottom spacer grid. This simplistic solution, however, is not feasible because zirconium alloy bar stock used for end caps is very expensive and because void volume within the fuel rod and/or the active fuel length would be negatively affected.

In response to this observation, Hatfield et al. designed a fuel assembly with a spring detent spacer grid of intersecting strips. The spring detent spacer grid allowed the grid to be moved downward, thereby reducing the solid zirconium alloy material length required. To preclude the "rod lift", the grid included a fuel rod capturing spring detent device. This device engaged a circumferential groove with tapered sides in the fuel rod end cap which created enough axial restraint to prevent or minimize rod lift under all flow conditions, but not enough restraint to significantly affect fuel rod reconstitution. In addition, integral leaves substantially symmetrically arranged on either side of the strip intersections were also added to greatly increase the likelihood that debris that passed the novel first or bottom spring detent spacer grid was too small to become trapped at a higher grid where it could damage the cladding of the active fuel region.

Despite these advantages, the spring detent feature was discovered to restrict rod replacement somewhat as compared to a standard lower spacer grid without a detent feature by requiring more pulling force to be applied to the rod during reconstitution.

Other spacer grids make use of conventional springs to hold fuel rods in place. For example, as discussed in U.S. Pat. No. 4,389,369 to Bryan, the disclosure of which is herein incorporated by reference, grid designs commonly include interwoven Inconel or Zircaloy straps which form multiple cells, each cell having springs on two adjacent walls and projections or dimples on each of the other two walls. The springs laterally impress resistive forces on each fuel rod in the assembly. Although this fuel assembly design performs exceptionally well in a nuclear reactor, one disadvantage inherent in the design is that the inwardly projecting springs and dimples occasionally mar or score the surface of fuel rods while they are being pulled into the fuel assembly grids. In carrying out this fuel rod loading operation, the grids are immovably held in position while a longitudinal steel rod attached to the end of a fuel rod pulls the fuel rod axially through the aligned openings, or cells, in the grids. As the rod engages the springs and dimples in the grid cells, their edges engage the exposed, relatively soft surface of the moving fuel rod and, in some cases, score its surface sufficiently deep as to cause the rod to fall outside established fuel rod surface specifications.

SUMMARY OF THE INVENTION

In view of the foregoing, it is readily apparent that, in prior art grid designs, the springs tend to hold the fuel rods too tenaciously during fuel rod reconstitution and/or tend to score the fuel rods during installation. One advantage of the present invention is the elimination or reduction of the above problems encountered with prior art grids.

This and other advantages have been achieved by using shape-memory alloys in the construction of part or all of the nuclear fuel assembly support structures.

For example, according to an embodiment of the present invention, a support structure for supporting one or a plurality of nuclear reactor components is provided. The support structure comprises a two-way shape-memory alloy having an overall transition temperature range substantially above atmospheric temperature and substantially below a temperature experienced by the shape-memory alloy during reactor operation such that the support structure assumes a first configuration for securely supporting the components at a temperature above the overall transition temperature while assuming a second configuration for loosely engaging the components below the overall transition temperature.

On further study of the specification and appended claims, further advantages of this invention will become apparent to those skilled in the art.

DETAILED DESCRIPTION OF THE PREFERRED INVENTION

Figure 1:
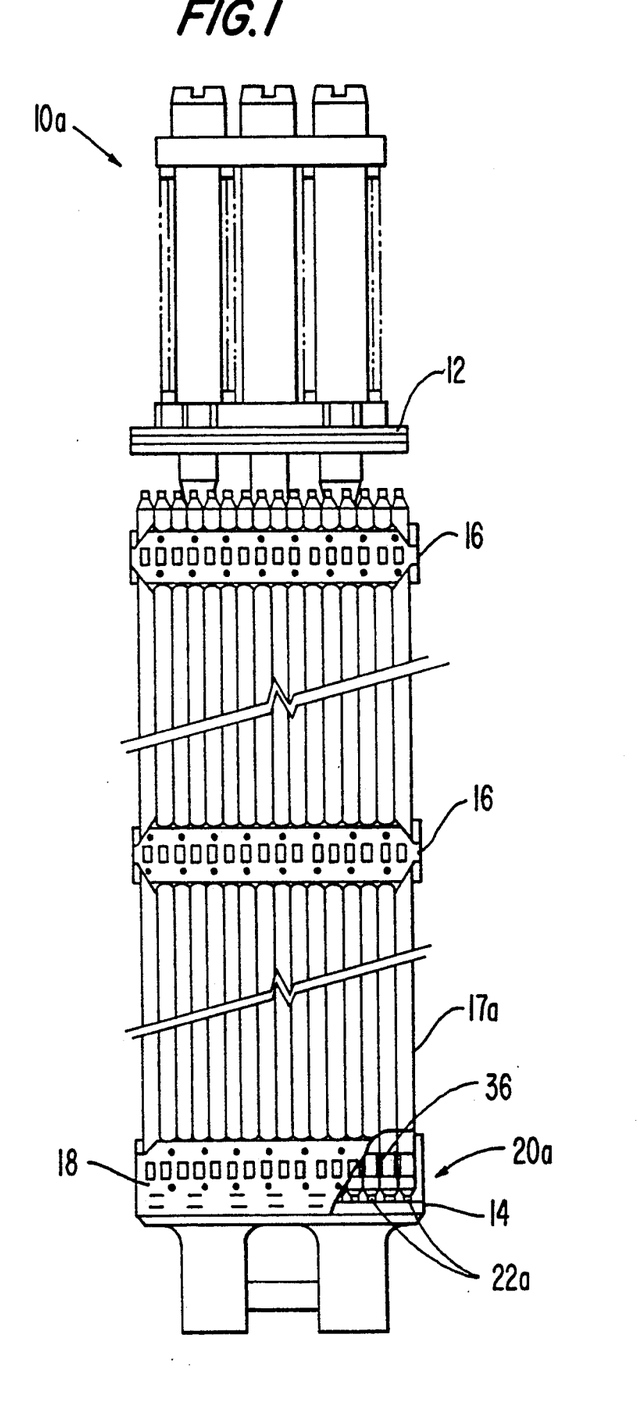
FIG. 1 is a schematic elevational view illustrating a fuel assembly of the present invention, including grooved end caps and a spring detent spacer grid for trapping debris.
Figure 2:
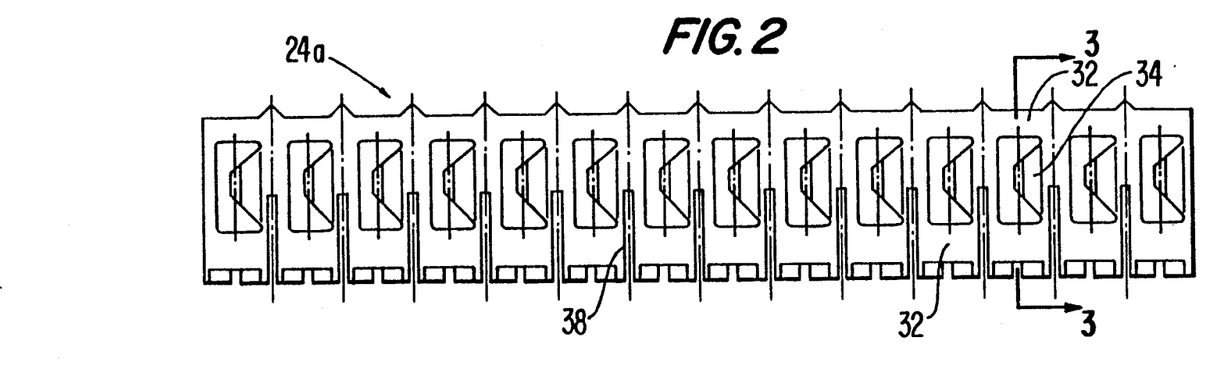
FIG. 2 is an elevational view of the top strip of the spring detent spacer grid of FIG. 1.
Figure 3:
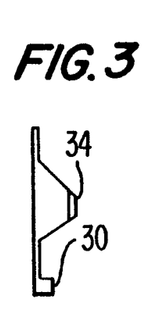
FIG. 3 is a cross-sectional view taken along the line 3—3 of FIG. 2.
Figure 4:
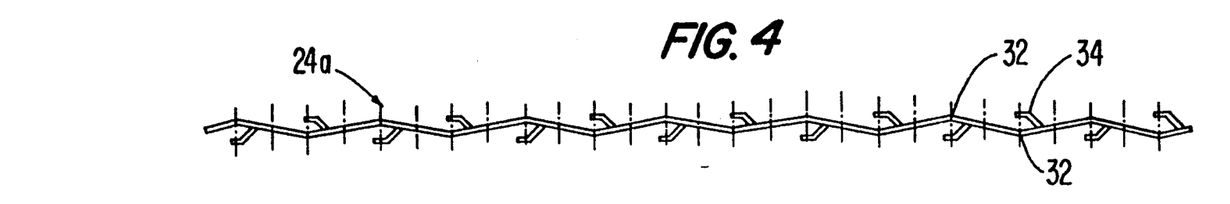
FIG. 4 is a plan view of the strip of FIG. 2, where the debris-catching features have been deleted for clarity.
Figure 5:
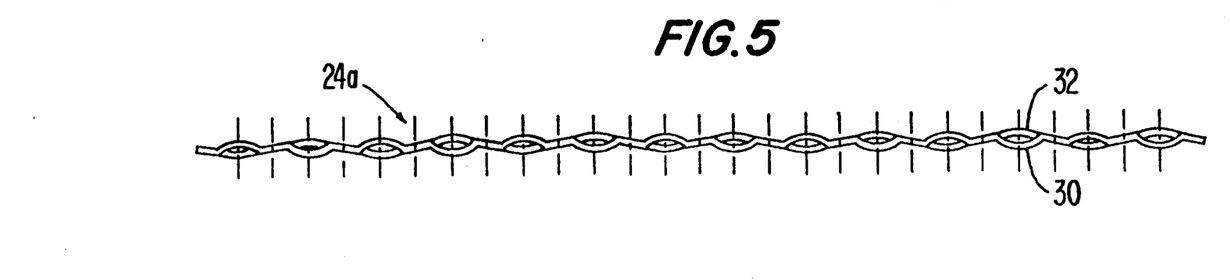
FIG. 5 is a bottom view of the strip of FIG. 2, where just the debris-catching features are shown.
Figure 6:
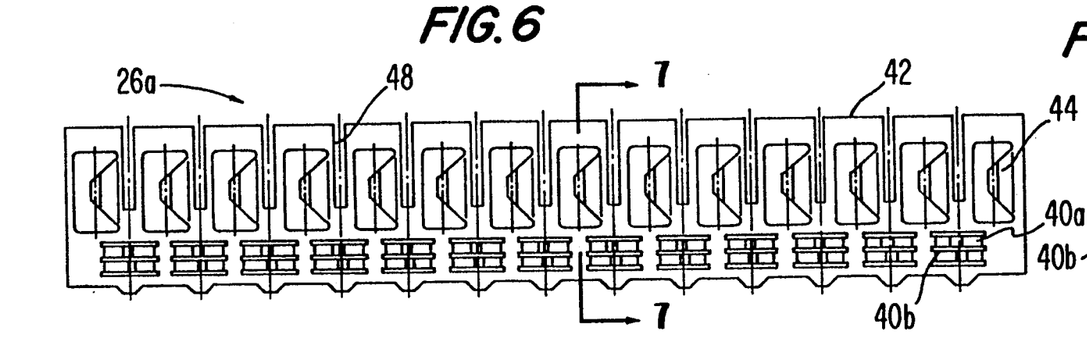
FIG. 6 is an elevational view of the bottom strip of the spring detent spacer grid of FIG. 1.
Figure 7:
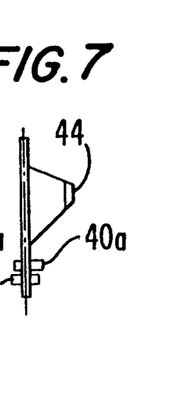
FIG. 7 is a cross-section view taken along the line 7—7 of FIG. 6.
Figure 8:
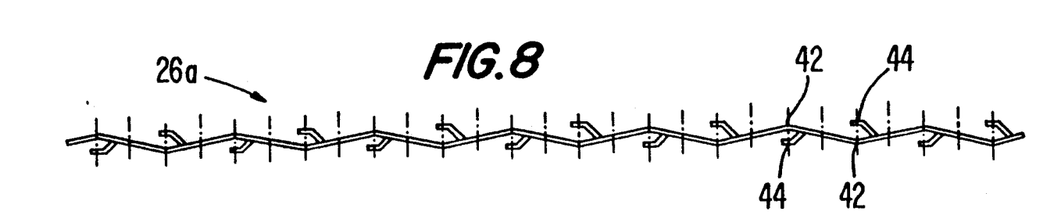
FIG. 8 is a plan view of the strip of FIG. 6, where the debris-catching features are shown.
Figure 9:
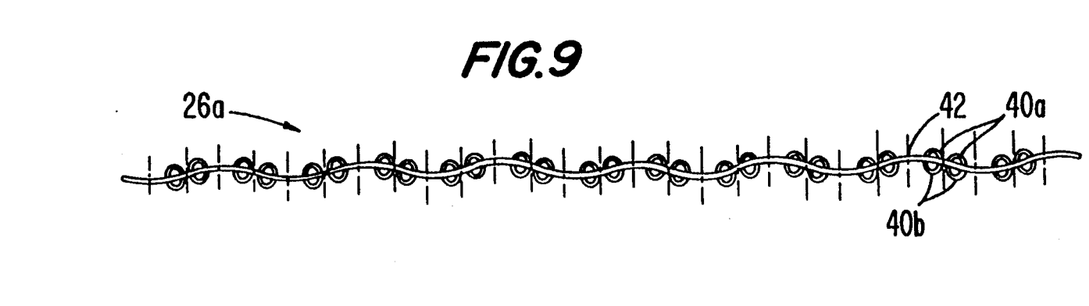
FIG. 9 is a bottom view of the strip of FIG. 6, where just the debris-catching features are shown.

The use of shape-memory alloys as support structures in nuclear fuel assemblies will be specifically discussed in terms of a spring detent spacer grid like that discussed in U.S. Pat. No. 5,024,807. Referring to FIG. 1, fuel assembly 10a includes an upper end fitting 12, a lower end fitting 14, spacer grids 16 supporting fuel rods 17a, and a perimeter skirt portion 18 shown partially broken away.

The spring detent spacer grid embodiment shown in connection with the fuel assembly of FIG. 1 is generally designated 20a and cooperates with circumferentially grooved end caps 22a with which it is in contact for rod-lift-preventing rod capture, for debris trapping and for debris retention below the active region, or cladding, of the fuel even with the coolant pumps off.

FIGS. 2 to 14 show the details of the strips utilized in making up spring detent spacer grid 20a. The strips 24a are the top strips of the "egg-crate" grid assembly. Strips 26a are the bottom strips and strips 28a are the perimeter strips.

As seen in FIGS. 2 to 5, the top strips 24a have leaves 30 opposite projections comprising arch portions or bends 32 and extending in the same direction as the springs 34 which seat in tapered sided circumferential grooves 36 of end caps 22a to provide rod-lift-preventing rod capture. The bends or arch portions 32 cooperate with the springs 34 to laterally hold the fuel rods 17a. Slots 38 facilitate the "egg-crate" assembly.

As seen in FIGS. 6 to 9, the bottom strips 26a have leaves 40a and 40b vertically displaced on opposite sides of the strip but located such that they will be substantially symmetrically located relative to the intersection of strips 24a and 26a when assembled into a grid. Bends or arch portions 42 and springs 44 cooperate with end caps 22a and grooves 36 in the same manner as do bends 32 and springs 34. Slots 48 accommodate the "egg-crate" assembly.

Figure 10:
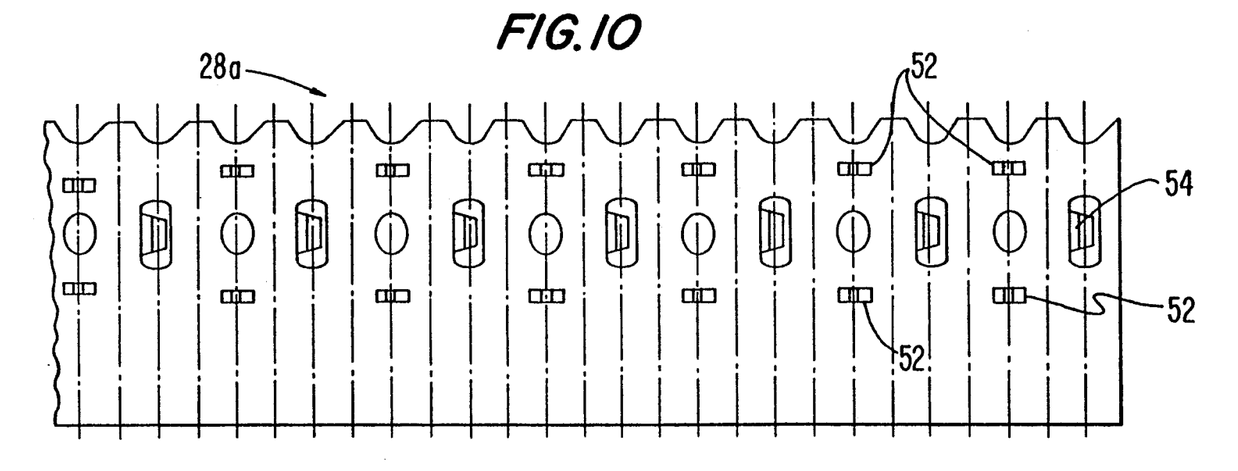
FIG. 10 is an elevational view of a typical perimeter strip of the type used on the spring detent spacer grid of FIG. 2.
Figure 11:
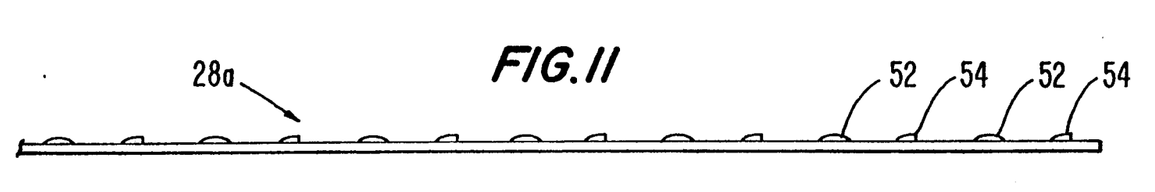
FIG. 11 is a plan view of the perimeter strip of FIG. 10.
Figure 12:
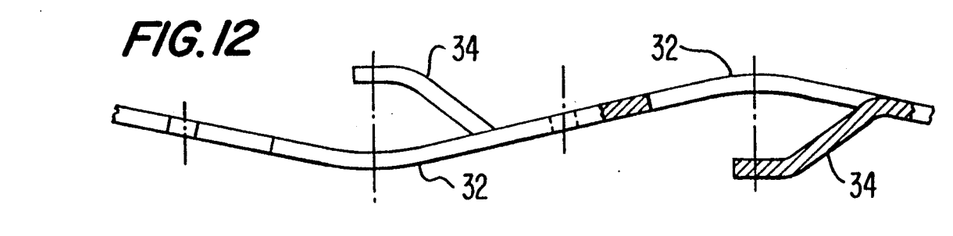
FIG. 12 is an enlarged portion of FIGS. 4 and 8.
Figure 13:
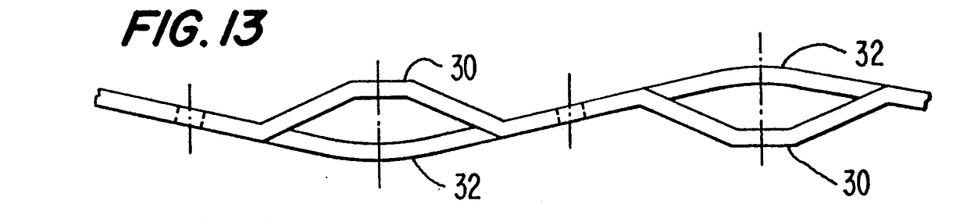
FIG. 13 is an enlarged portion of FIG. 5.
Figure 14:
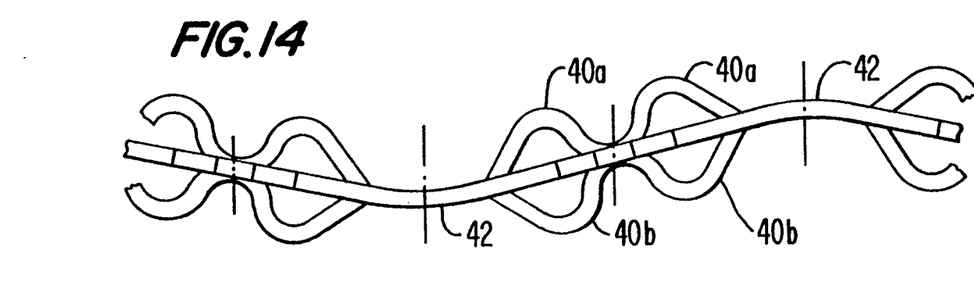
FIG. 14 is an enlarged portion of FIG. 9.

The perimeter strip 28a illustrated in FIGS. 10 and 11 is one typical type, but other designs are contemplated. The leaves 52 provide the arch functions and the springs 54 engage the grooves 36 in end caps 22a. The perimeter strip 28a is straight without bends of the type design area by the numerals 32 and 42.

Figure 15:
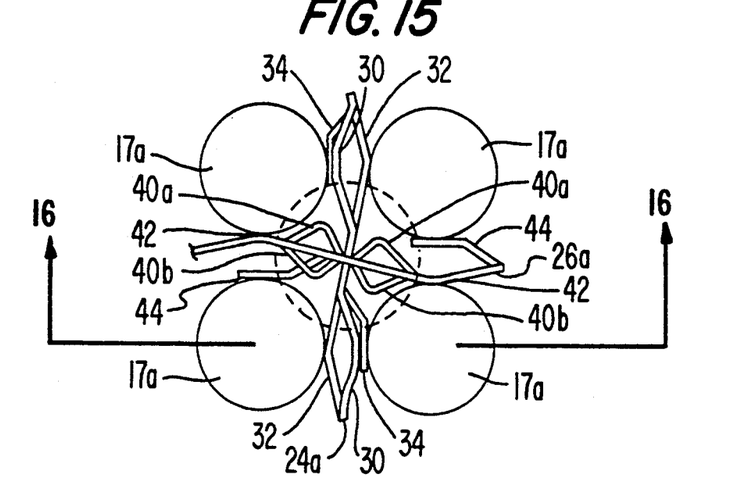
FIG. 15 is a schematic cross-section of the area of intersection of two strips of the spring detent spacer grid of FIG. 1.
Figure 16:
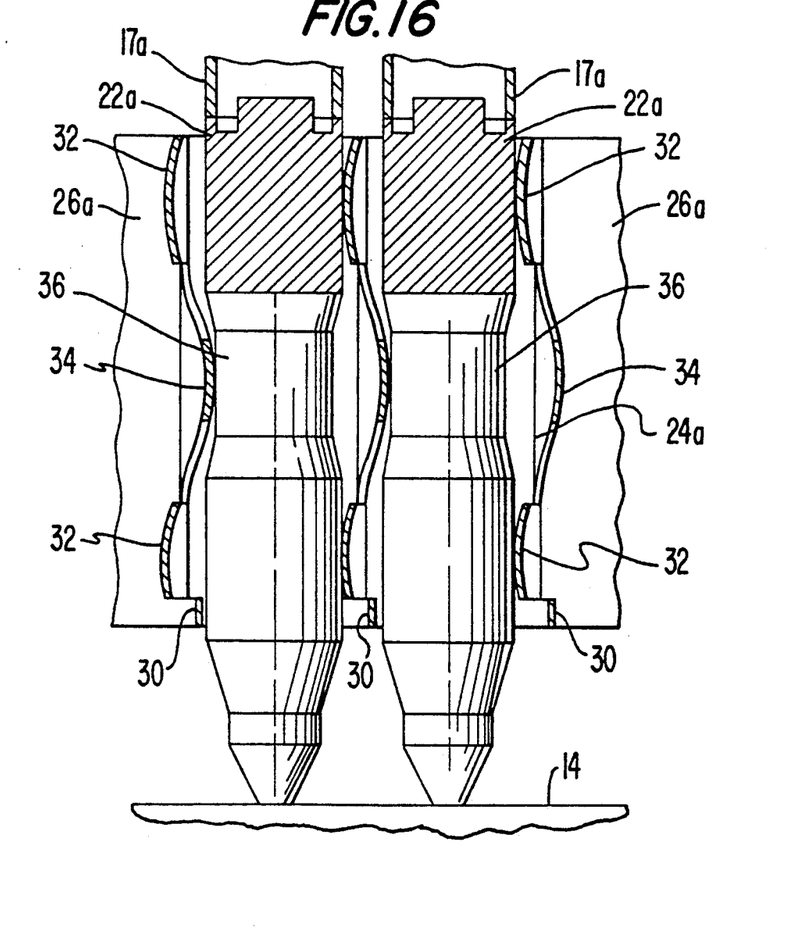
FIG. 16 is a cross-section taken along line 16—16 of FIG. 15.

FIGS. 15 and 16 show the relation of symmetry and the relative elevation of the features of the spring detent spacer grid. From these figures it is easy to see why debris is trapped and retained in the various tapered passageways created in the area just above the lower end fitting 14.

According to an embodiment of the present invention, the spring detent spacer grid 20a is preferably constructed using shape-memory alloys. Shape-memory alloys are well known in the art. See, for example, C.M. Wayman, *Journal of Metals.* pp. 129-137, June 1980; *Encyclopedia of Materials Science and Engineering*, MIT Press, Cambridge, Mass., Vol. 6, pp. 4635-4674 (1986); and *Kirk-Othmer Encyclopedia of Chemical Technology*, John Wiley & Sons, New York, Vol. 20, pp. 726-736 (1982), the disclosures of which are incorporated herein by reference.

When an ordinary metal is strained beyond its elastic limit, permanent deformation of the material is produced. For most metals, this yield point corresponds to a fraction of a percent strain. Any strain beyond this point is defined as plastic deformation and is expected to remain. For example, it would be very surprising if an extensively kinked metal wire were to straighten out spontaneously when heated, however, this is exactly what certain shape-memory alloys are able to do. If one of these alloys is deformed below a critical temperature, it may recover its original unbent shape when it is reheated. The reheating "reminds" the alloy that it prefers a different crystal structure and associated shape at higher temperature. This unusual behavior has been termed the "shape-memory effect."

Without being held to any particular theory, it is currently believed that the shape-memory effect is based on the continuous appearance and disappearance of the martensite phase with falling and rising temperatures. This thermoelastic behavior is the result of the transformation from a parent phase stable at elevated temperature to the martensite phase. A specimen in the martensite phase may be deformed in what appears to be a plastic manner but is actually deforming as a result of the growth and shrinkage of self-accommodating martensite plates. When the specimen is heated to the temperature of the parent phase, a complete recovery of the deformation takes place. Complete recovery in this process is limited by the fact that strain must not exceed a critical value which ranges, for example, from 3-4% for copper shape-memory effect alloys to 6-8% for nickel-titanium shape-memory alloys.

Figure 17:
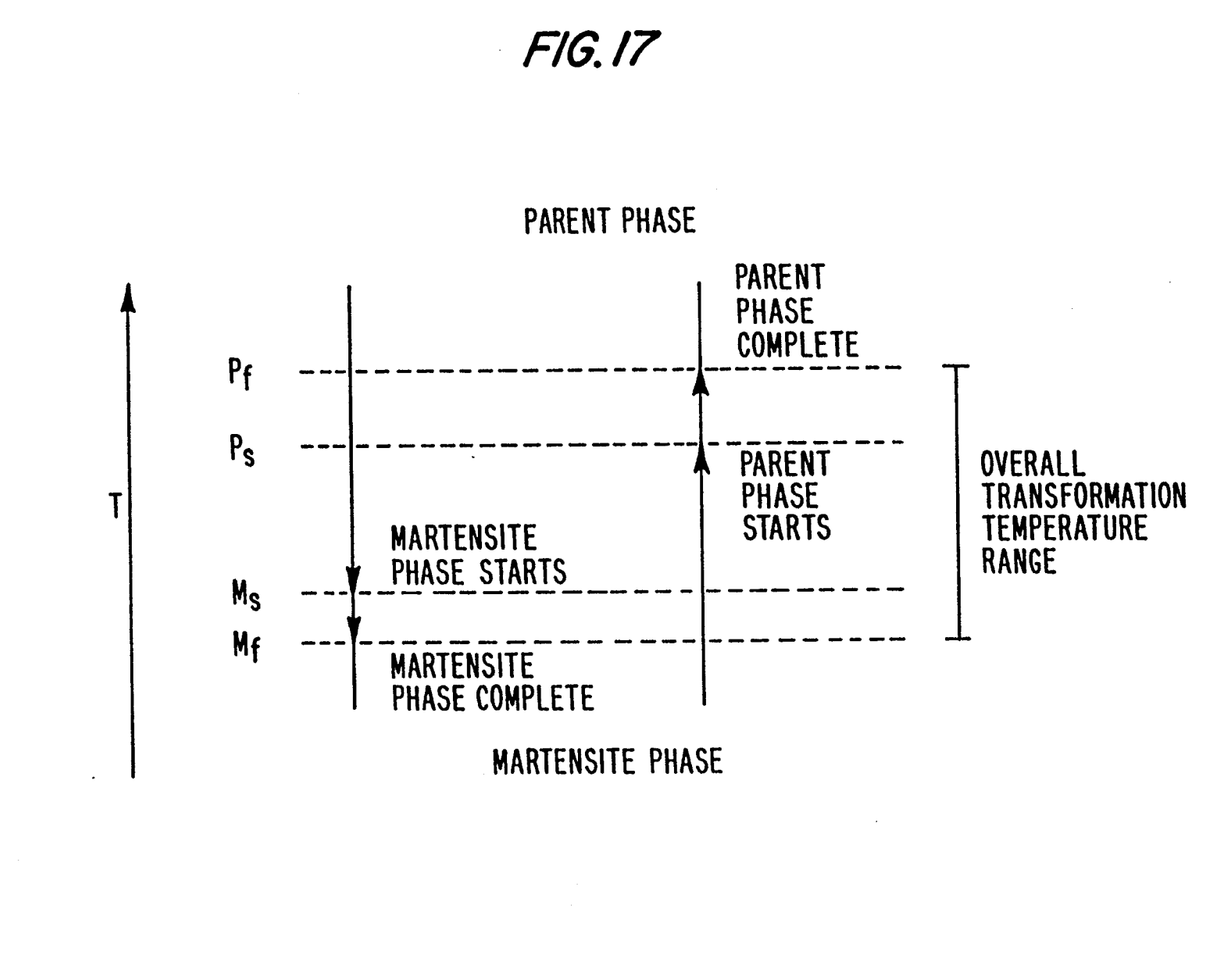
FIG. 17 illustrates typical transformations between the parent and martensite phases of a shape-memory alloy with temperature.

According to FIG. 17, the temperature T at which the martensite phase starts to form from the parent phase on cooling is referred to as $M_s$ and the temperature at which the parent phase has been completely transformed to the martensite phase is $M_f$. On heating a martensitic specimen, the temperature at which the transformation begins to reverse to the parent phase is designated $P_s$. The reverse transformation to the parent phase is completed at a higher temperature designated $P_f$. Although a single parent phase typically forms on heating, the martensite phase usually displays a number of variants on cooling.

Note that there is typically a slight hysteresis between the forward and reverse transformation ranges, so that the transformation from parent phase to the martensite phase on cooling occurs over a slightly lower range ($M_s$ to $M_f$) than the reverse transformation on heating ($P_s$ to $P_f$). The range $M_s$ to $M_f$ is herein referred to as the "martensite transformation temperature range"; the range $P_s$ to $P_f$ is herein referred to as the "parent transformation range". The temperature range encompassing $M_s$, $M_f$, $P_s$ and $P_f$ is defined herein as the "overall transformation temperature range."

It is possible to condition or "train" a shape-memory effect alloy to have a two-way shape-memory effect. The two-way shape-memory effect is a spontaneous, reproducible, reversible shape change associated with heating and cooling throughout the overall transformation temperature range. The reversible shape change could be, for example, bending and unbending or twisting and untwisting as the trained shape-memory effect alloy sample is cycled between the $M_f$ and $P_f$ temperatures (i.e., through the overall transformation temperature range).

Alloys for which two-way shape-memory effect has been observed include Cu-Al, Cu-Zn-Al, In-Tl and Ti-Ni-Al, and possible alloys of zirconium, such as Zr-Ni. This two-way shape-memory conditioning is apparently brought about by limiting the number of martensite variants that form upon cooling through the application of an external stress during the transformation. It is believed that the limit imposed upon the number of variants formed reduces the self-accommodating feature of the usual transformation and increases the residual stress. By repeating the process a number of times, the restricted variant group and its associated internal stress spontaneously revert to the parent phase on heating and then to a singular martensite group on cooling. The two-way shape-memory training procedure can be illustrated by the following examples:

(a) A straight wire is cooled below $M_f$ and bent to a desired shape. The bending stress is accommodated by the formation of a reduced number of preferred variants of martensite plates. The specimen is then heated to a temperature above $P_f$ and becomes straight again. This procedure is repeated 20-30 times. This completes the training, and the sample now bends to its programmed shape when cooled below $M_f$ and becomes straight when heated above $P_f$. After the initial training, the reversible shape change associated with cooling and heating may be repeated indefinitely.

(b) The wire is deformed or bent above $M_s$ to produce preferred variants of stress-induced martensite and is then cooled below $M_f$. Upon subsequent heating above $P_f$ the wire becomes straight again. This procedure is repeated about 20-30 times to complete the memory training.

Thus, once the two-way shape-memory effect has been achieved, a specimen can, for example, assume a stable high temperature configuration when the metal is raised above $P_f$ and assume a stable low temperature configuration when the metal is cooled below $M_f$.

A two-way shape-memory effect has been used, for example, in the design of couplings that can be easily and reliably applied to and removed from pipes to be joined. Such couplings are disclosed in U.S. Pat. No. 4,198,081 to Harrison et al., the disclosure of which is herein incorporated by reference. Moreover, shape-memory alloys have also been proposed for use in nuclear fuel rods as a pellet stack holding means in U.S. Pat. No. 4,699,757 to Cloue, the disclosure of which is herein incorporated by reference. In U.S. Pat. No. 4,699,757, through the use of a shape-memory alloy, the stack holding means engages a nuclear fuel rod sheath (or cladding) at low temperatures, retaining the stack of pellets enclosed within the sheath. At higher temperatures, the stack holding means is released from frictional engagement with the sheath and is free to move to accommodate expansion in the stack of pellets.

Essentially any shape-memory alloy can be used in the present invention so long as it demonstrates adequate two-way shape-memory effect and possesses an overall transition temperature range substantially above room temperature and substantially below the temperature of the environment to which the shape-memory alloy is subjected during reactor operation. Shape-memory alloys also preferably exhibit good corrosion resistance under reactor operating conditions and ideally exhibit low neutron capture cross-section. Presently preferred shape-memory alloys include nickel-titanium alloys such as Raychem's K or BH Alloys.

Since it is a characteristic of a shape-memory alloy to change its configuration when it is passed through the overall transition temperature range, it can be used in the construction of fuel assembly grids to provide a significant degree of support engagement during operation (i.e., at high temperatures), while providing a reduced degree of support during shut-down (i.e., at lower temperatures). For example, the use of a shape-memory alloy in the construction of the spring detent spacer grid 20a described in FIGS. 1-16 above would enhance the resistance to rod lift during operation while facilitating fuel rod reconstitution when not in operation. One way that the shape-memory alloy can be incorporated into the design of the spring detent spacer grid 20a is by completely manufacturing the spring detent spacer grid 20a from the shape-memory alloy. Alternatively, the springs 34, 44, 54 and/or bends or arch portions 32, 42, or leaves 52 can be constructed with the shape-memory alloy.

In the event that the entire spring detent spacer grid 20a comprises a shape-memory alloy, the spring detent spacer grid 20a can be constructed to contract to a high temperature configuration and tightly grip the fuel rods upon heating above the parent transition temperature range of the shape-memory alloy, and to expand to a low temperature configuration upon cooling below the martensite transition temperature range of the shape-memory alloy.

In the event that the springs 34, 44, 54 comprise a shape-memory alloy, the springs 34, 44, 54 will preferably engage the grooves 36 in the end caps 22a upon heating above the parent transition temperature range to a high temperature configuration of the shape-memory alloy. Conversely, the springs 34, 44, 54 will preferably disengage the grooves 36 once the shape-memory alloy is cooled below the martensite transition temperature range and converts to its low temperature configuration. Similarly, arches 32, 42, and leaves 52 constructed of a shape-memory alloy can be designed to engage the fuel rods 17a at high temperatures and disengage the fuel rods 17a at low temperatures. From the above illustrations where springs 34, 44, 54 and/or arches 32, 42, and leaves 52 comprise a shape-memory alloy, it can be seen that any component which laterally projects into the openings in the spring detent spacer grid 20a for contact with the fuel rods 17a can comprise a shape-memory alloy for increased lateral projection at high temperatures relative to low temperatures.

Of course, shape-memory alloys could also be used in the construction of conventional spacer grids having spring-retaining means such as those discussed in U.S. Pat. Nos. 4,389,369 and 4,077,843, the disclosures of which are herein incorporated by reference. Moreover, a grid comprising a shape-memory alloy could also be employed in BWR designs where rods are held in place by the bottom tie plate. For example, the tie plate could employ the shape-memory alloy or the bottom grid could be designed using shape-memory alloys to allow hydraulic improvements in tie plates.

Thus, the application of shape-memory alloys to the construction of nuclear fuel assemblies supporting structures has been illustrated. These applications include, in particular, spacer grids in BWR's and PWR's, but can also include, for example, channel supports for BWR's and fuel assembly skeletons for PWR's. The use of the alloys in the construction of BWR channels would allow channels to be securely supported in operation yet easily movable during refueling operations. The use of the alloys in the construction of PWR fuel assembly skeletons can more readily allow for designs in which components of the fuel assembly can be replaced or design changes made between operational cycles. This can be accomplished, for example, by allowing for the use of coupling and supports which are engaged during operations and can be readily pulled apart between operating cycles so that changes can be made. Changes such as partial fuel bundles, and replacement of fuel assembly skeleton support thimbles by fuel rods can then be more easily made.

Although there are many additional specific connection designs which can be described from the foregoing description, one skilled in the art can easily ascertain the essential characteristics of this invention, and without departing from the spirit and scope thereof, can take various changes and modifications of the invention to adapt it to various usages and conditions.

I claim:

1. A spacer grid for use in a nuclear reactor fuel assembly comprising:
   openings for receiving, supporting and spacing a plurality of elongated nuclear fuel rods; and
   a plurality of spring members biased into said openings for applying lateral forces against said fuel rods, said spring members comprising a shape-memory metal having a two-way memory characteristic and an overall transformation temperature range substantially above atmospheric temperature and substantially below an operating temperature experienced by said spring members such that said spring members assume a first configuration below said overall transition temperature range wherein said lateral forces are minimized and a second configuration above said overall transition temperature range wherein said lateral forces are maximized.

2. The spacer grid of claim 1, wherein said shape-memory metal comprises a titanium-nickel alloy.

3. A spacer grid for use in a nuclear reactor fuel assembly comprising:
   openings for receiving, supporting and spacing a plurality of elongated nuclear fuel rods; and
   a plurality of lateral projections laterally extending into said openings, said lateral projections further comprising a shape-memory metal having a two-way memory characteristic and an overall transformation temperature range substantially above atmospheric temperature and substantially below an operating temperature experienced by said lateral projections such that said lateral projections assume a first configuration below said overall transition temperature range wherein said lateral projections extend into said openings to a maximum extent and a second configuration above said overall transition temperature range wherein said lateral projections extend into said openings to a minimum extent.

4. The spacer grid of claim 3, wherein said shape-memory metal comprises a titanium-nickel alloy.

5. The spacer grid of claim 3, wherein said lateral projections are arches.

6. The spacer grid of claim 3, wherein said lateral projections are spring members.

7. A support structure for supporting one or a plurality of nuclear reactor components, said support structure comprising a shape-memory metal having a two-way memory characteristic and an overall transition temperature range substantially above atmospheric temperature and substantially below a temperature experienced by said shape-memory alloy such that said support structure assumes a first configuration for securely supporting said components at a temperature above said overall transition temperature range while assuming a second configuration for loosely engaging said components below said overall transition temperature range wherein said support structure is a spacer grid and said components are fuel rods.

8. The support structure of claim 7, wherein said shape-memory metal comprises a titanium-nickel alloy.

* * * * *